(12) United States Patent
Ho et al.

(10) Patent No.: US 8,070,007 B2
(45) Date of Patent: Dec. 6, 2011

(54) HERB KEEPER WITH FLEXIBLE PROJECTION

(75) Inventors: Neal Ho, San Francisco, CA (US); David Chan, Scarborough (CA)

(73) Assignee: Browne & Co., Markham, Ontario (CA)

( * ) Notice: Subject to any disclaimer, the term of this patent is extended or adjusted under 35 U.S.C. 154(b) by 29 days.

(21) Appl. No.: 12/458,097

(22) Filed: Jun. 30, 2009

(65) Prior Publication Data

US 2010/0326856 A1 Dec. 30, 2010

(51) Int. Cl.
*B65D 21/02* (2006.01)
*B65D 3/28* (2006.01)
*B65D 25/08* (2006.01)

(52) U.S. Cl. .............. 220/23.89; 99/415; 220/573.4; 220/574.3; 220/735; 426/110; 426/112

(58) Field of Classification Search .......... 206/804; 220/23.83–23.9, 501–503, 735, 573.4, 573.5, 220/574.3; 426/112, 115, 124, 110; 99/287, 99/297, 467, 359, 403, 407, 410, 413, 416, 99/415
See application file for complete search history.

(56) References Cited

U.S. PATENT DOCUMENTS

| | | | | |
|---|---|---|---|---|
| 1,131,650 A * | 3/1915 | Alexander | ............. | 220/23.87 |
| 1,205,026 A * | 11/1916 | Rodgers | ............. | 99/410 |
| 3,069,043 A * | 12/1962 | Bishop | ............. | 220/573.4 |
| 3,237,549 A * | 3/1966 | Pospischil | ............. | 220/23.87 |
| 3,380,592 A * | 4/1968 | Arnold | ............. | 426/115 |
| 3,946,654 A * | 3/1976 | Janssen | ............. | 99/403 |
| 4,215,629 A * | 8/1980 | Janssen | ............. | 99/403 |
| 4,491,219 A * | 1/1985 | Lutz | ............. | 220/23.86 |
| 4,595,113 A * | 6/1986 | Fafflok et al. | ............. | 220/23.87 |
| 5,082,135 A * | 1/1992 | DeCoster | ............. | 206/804 |
| 5,634,569 A * | 6/1997 | DeCoster | ............. | 220/735 |
| 5,868,266 A * | 2/1999 | Nobakht | ............. | 220/23.86 |
| 5,988,050 A * | 11/1999 | Foster, Jr. | ............. | 99/467 |
| 6,036,038 A * | 3/2000 | Lovelace et al. | ............. | 206/804 |
| 6,099,812 A * | 8/2000 | Allen et al. | ............. | 220/735 |
| 7,690,523 B2 * | 4/2010 | Harris | ............. | 220/23.89 |
| 2008/0061060 A1 * | 3/2008 | Aubrey | ............. | 220/23.87 |

* cited by examiner

*Primary Examiner* — Bryon Gehman
(74) *Attorney, Agent, or Firm* — Gowling Lafleur Henderson LLP (57) ABSTRACT

Described is a herb keeper comprising a body having a closed end and an open end defining a cavity therebetween, and a removable tray portion sized to be slidingly received within the cavity of the body, at least one flexible projection extending from the body toward the tray portion, wherein the tray portion is held in a rest position by the at least one flexible projection.

12 Claims, 7 Drawing Sheets

HERB KEEPER WITH FLEXIBLE PROJECTION

FIELD OF THE INVENTION

The present matter relates to a herb keeper and more particularly a herb keeper that provides a user with easy access to any herbs, or other items, kept within it.

BACKGROUND OF THE INVENTION

In the field of culinary arts there are several methods used to maintain the freshness of herbs and other food items. In order to keep certain food items for a reasonable period of time it is necessary to keep them fresh and provide them with a source of water. Examples of food items that may be stored include herbs, attached to their stem or stalk and optionally including their roots, asparagus, and other similar food items. While a container with water in the bottom may suffice, it is generally not easy to keep such a set up in a refrigerator or in a place where it will protect the herbs. In addition, it does not provide a user with easy access to the herbs.

There is always a need for a herb keeper that allows herbs, or other food items, to be kept for a long time, will providing easy access to a user for extracting the desired herb(s).

SUMMARY OF THE INVENTION

There is provided a herb keeper that keeps the herbs within an environment that keeps them fresh while protecting them from external factors, and that allows a user to easily access the herb of choice without any difficulty.

There is further provided a herb keeper comprising a body having a closed end and an open end defining a cavity therebetween and a removable tray portion sized to be slidingly received within the cavity of the body. At least one flexible projection extends from at least one of the body and the tray portion toward the other of the body or the tray portion, wherein the tray portion is held in a rest position by the at least one flexible projection.

In one aspect the at least one projection is supported by the body. In an alternative aspect the at least one projection is supported by the tray portion.

BRIEF DESCRIPTION OF THE DRAWINGS

The herb keeper will now be described in further detail with reference to the following figures.

DETAILED DESCRIPTION OF THE PREFERRED EMBODIMENTS

The present matter relates to a herb keeper that includes an internal tray portion for holding herbs. The tray portion is operable to move up and down within the herb keeper and to rest upon an internal shelf-like structure to allow for easy removal of the herbs from the tray portion by a user. While reference is made throughout the specification to a "herb keeper", it will be understood that other food items which need to be kept fresh may be kept within the apparatus described herein.

Aspects of the present matter will now be described in detail with reference to the accompanying Figures.

The herb keeper, indicated generally at 10, includes a cylindrical body 12 having a closed end 14 and an open end 16 and defining a cavity 18 therebetween. The cavity is sized to be able to receive a removable tray portion 20, described in further detail below, that is sized to receive one or more herb products (not shown) such as tarragon, thyme, rosemary etc. or fresh vegetable products such as asparagus. The term "herb" will be used to denote such food products. In one embodiment, the cylindrical body 12 is sized to be able to fit within the door of a standard refrigerator. However, it will be understood that the herb keeper described herein is not limited to this size and may be produced having varying sizes and shapes provided that it includes the features and operability described herein.

The cylindrical body 12 is made from food grade material. Preferably, the cylindrical body is transparent to allow a user to be able to see the herbs that are stored within it and to allow for the passage of light through the body. For example, the cylindrical body may be made from any food grade plastic that is transparent. Examples of materials that may be used include, but are not limited to, styrene acrylonitrile plastic (SAN), acrylic, acrylonitrile butadiene styrene (ABS), methyl methacrylate styrene (MS) and nylon.

As mentioned above, a tray portion 20 is sized to be received within the cavity 18 of the cylindrical body 12. The tray portion 20 is operable to move up and down within the cavity 12 of the body. The tray portion 20 includes a lower surface 22 having a plurality of apertures 24 therein, shown clearly in FIG. 3, and a peripheral wall 26 extending upwardly from the lower surface 22 and around the entire periphery of the lower surface 22. At the upper end of the peripheral wall 26, opposite the lower surface 22, is an upper lip portion 28 that extends outwardly from the peripheral wall 26. When the tray portion 20 is received within the cavity 18 the upper lip portion 28 extends towards the inner surface of the cylindrical body 12, or cavity 18.

Connected to the tray portion 20 is an elongated handle 30 that enables a user to move the tray portion 20 up and down within the cavity 18 of the cylindrical body 12. The handle 30 may be connected to any part of the tray portion 20 that allows for movement of the tray portion 20 within the cavity 18. In a preferred embodiment, the handle 30 is connected to the centre point of the lower surface 22.

While the Figures show a cylindrical body 12 with a circular tray portion 20, it will be understood that the herb keeper 10 is not limited to these shapes, i.e. the body 12 need not be cylindrical. The body 12 and tray portion 20 may be other shapes provided they are similar in shape to each other and can function as described herein, i.e. the tray portion 20 can move up and down within the body 12.

Located at the upper end of the handle 30, opposite the lower surface 22, is a knob portion 32 that provides a user with an easy grip for moving the handle 30 and tray portion 20. Located adjacent the knob portion 32 is a lid portion 34 that is sized to be received on the open end 16 of the cylindrical body 12 when the tray portion 20 is positioned within the cavity 18 of the cylindrical body 12.

Figure 5:
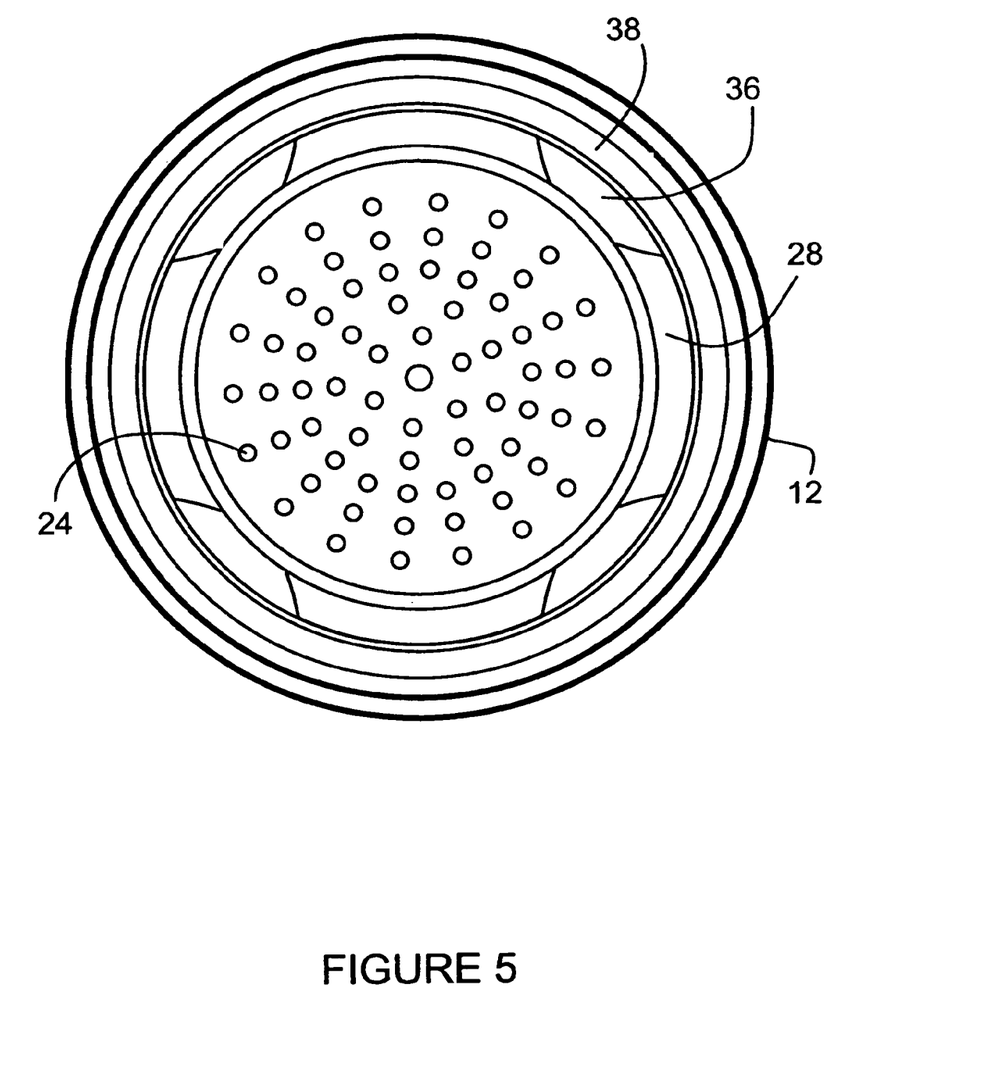
FIG. 5 is a cross sectional top view of the herb keeper showing the tray portion of the herb keeper in a raised position.
Figure 6:
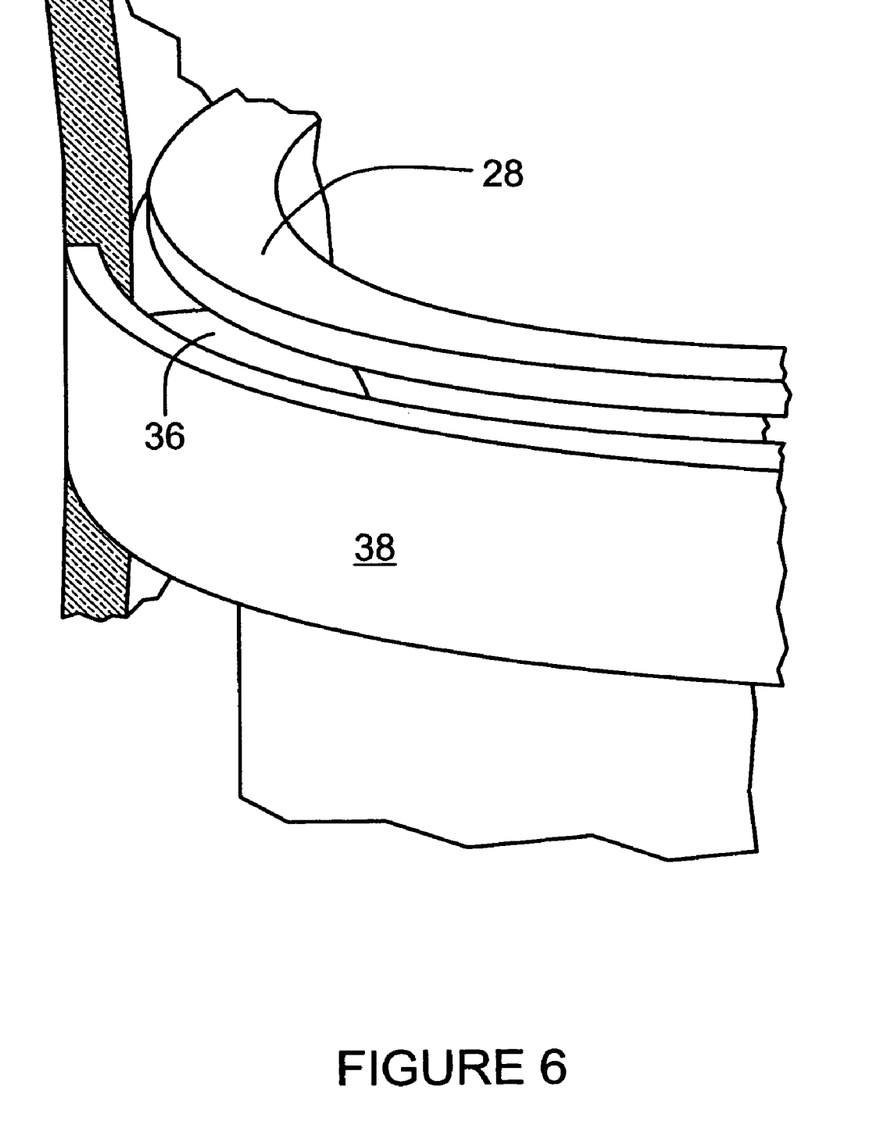
FIG. 6 is an enlarged view of a portion of the tray portion of the herb keeper in a resting position.

Extending from the inner wall of the cylindrical body 12 are flexible projections 36, clearly shown in FIGS. 5 and 6. The projections are sized to extend into the cavity 18 defined by the cylindrical body 12, beyond the external edge of the tray portion 20, when the tray portion 20 is positioned within the cavity 18. In particular, the projections 36 extend into the cavity 18 beyond the upper lip portion 28 of the tray portion 20, as seen in FIG. 5. The projections 36 may be integral with the cylindrical body 12 or may be a separate component that is supported by the cylindrical body 12. For example, the projections 36 may be formed on a separate collar portion 38, described further below.

The projections are made of a material that is flexible and, upon forcible movement of the tray portion 20 adjacent the projections 36, will flex to allow the tray portion 20 to move beyond the projections 36. This means that when the tray portion 20 is pulled upwardly by a user and reaches the projections 36, the projections 36 will flex upwardly and allow the tray portion 20, and in particular the upper lip portion 28, to move beyond the projections 36. Once the upper lip portion 28 has moved past the projections 36, the projections return to their original, at rest, position, i.e extending inwardly from the inner wall of the cylindrical body 12. Likewise, when a user pushes the tray portion 20 towards the closed end 14 of the cavity 18, the upper lip portion 28 will push the projections 36 downwardly, and once the upper lip portion 28 moves past the projections 36 they will return to their original position.

Figure 1:
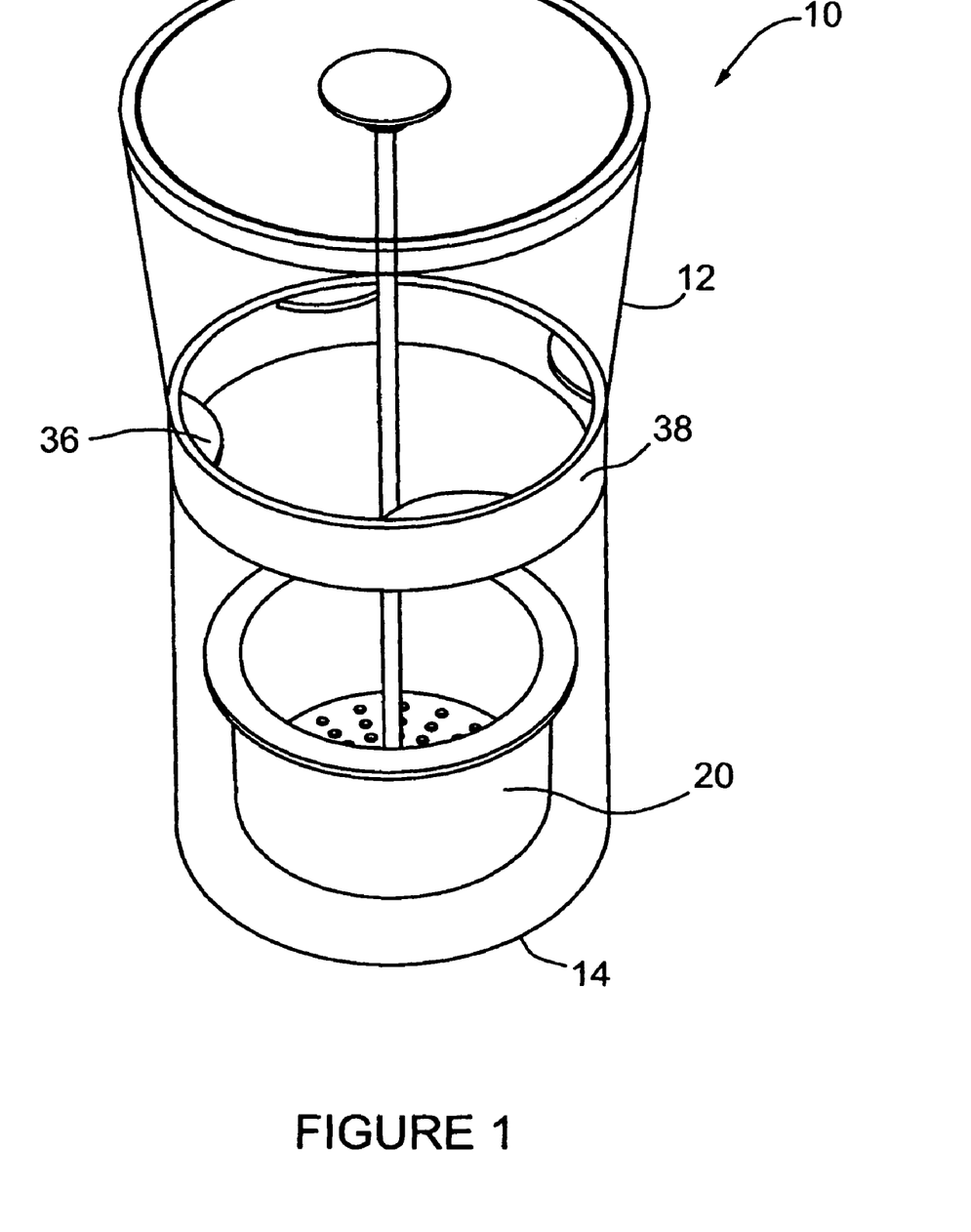
FIG. 1 is a perspective view of one embodiment of the herb keeper in a closed position.
Figure 2:
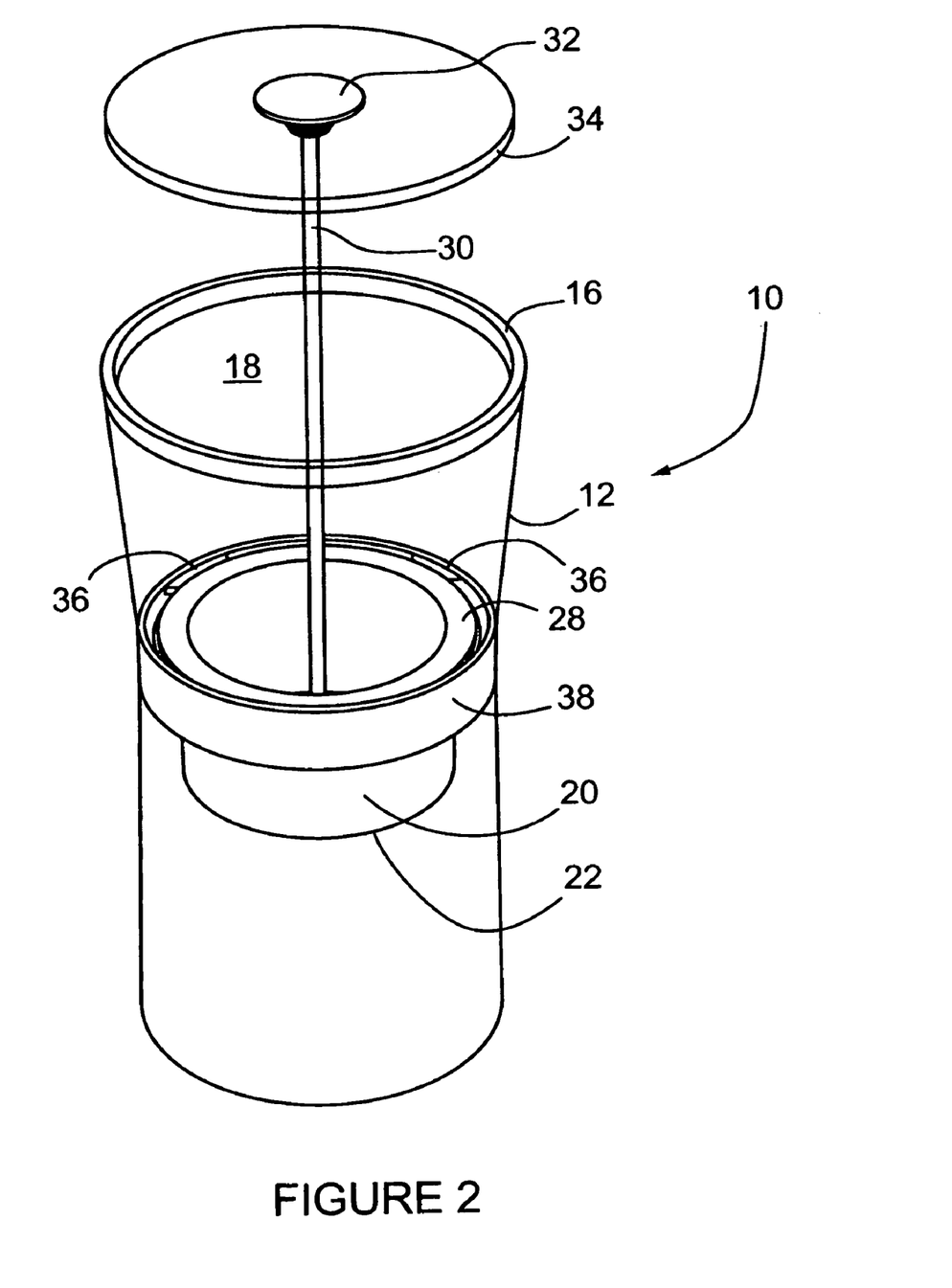
FIG. 2 is a perspective view of one embodiment of the herb keeper in an open position.
Figure 3:
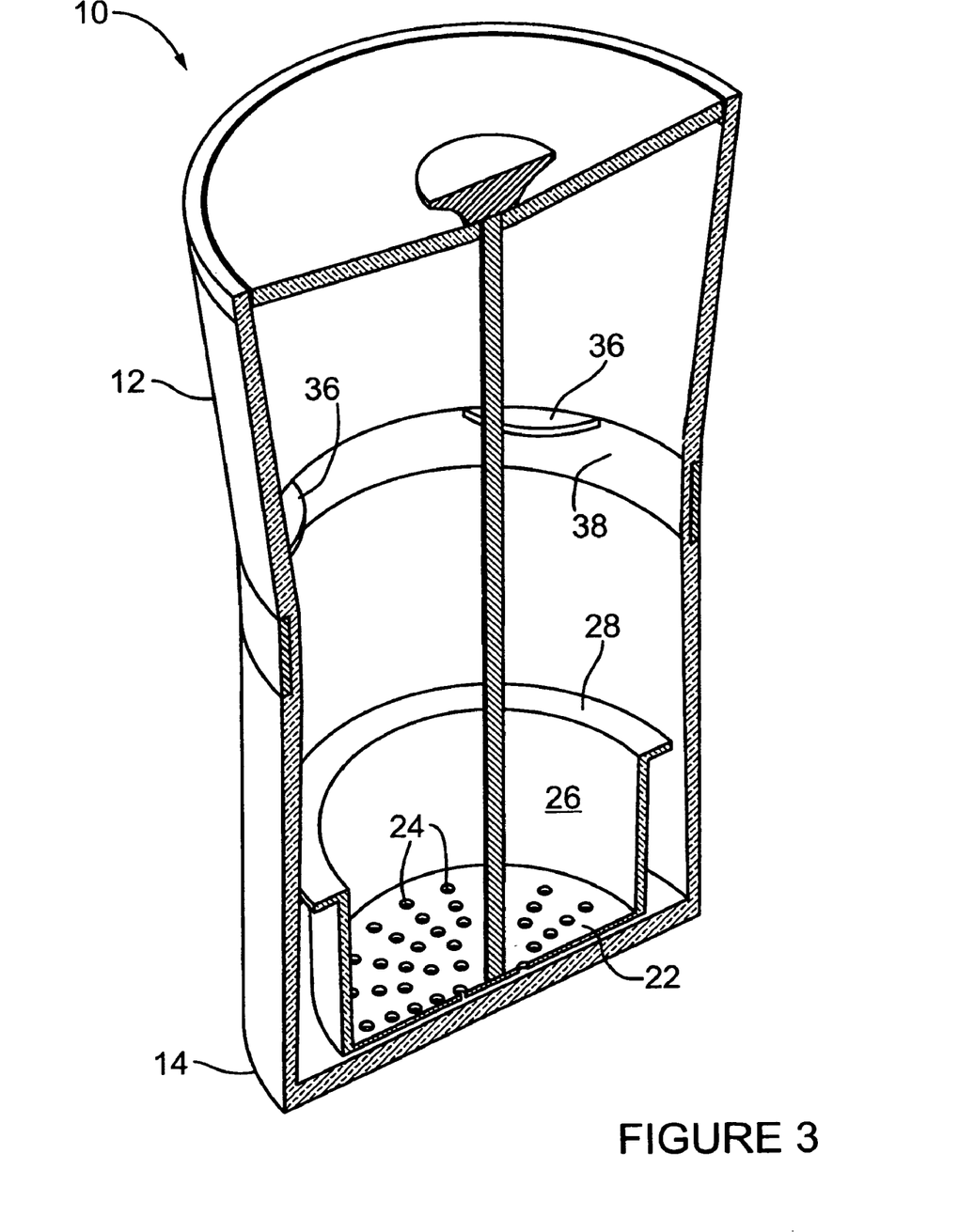
FIG. 3 is a cross sectional view of the herb keeper of FIG. 1.
Figure 4:
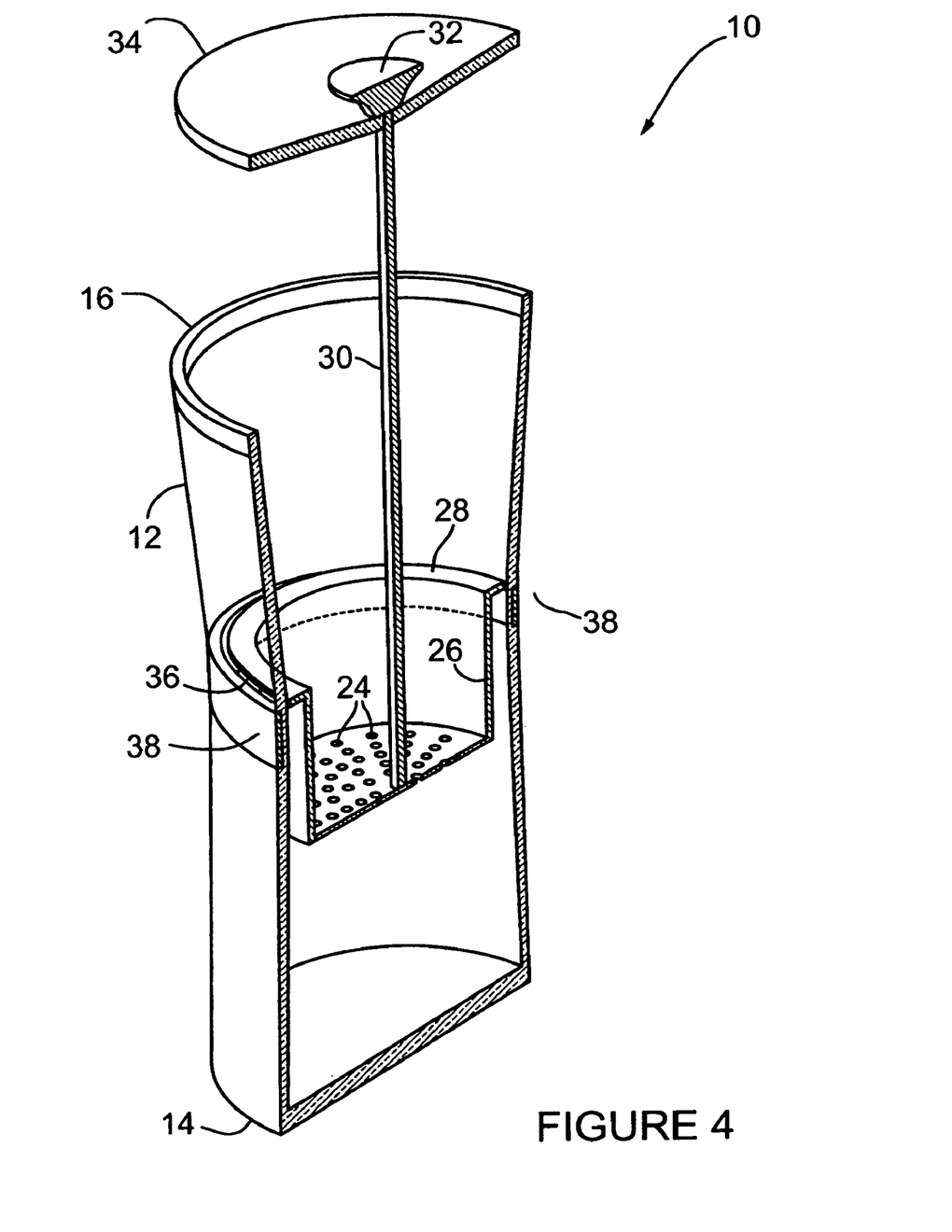
FIG. 4 is a cross sectional view of the herb keeper of FIG. 2.

The flexible projections 36 are formed from a material that, while allowing for flexibility when a user pushes or pulls against the tray portion 20, will also provide sufficient rigidity to remain in the at rest position, i.e. extending into the cavity 18, when no excess force is applied against them, as shown in FIG. 3. This means that when the tray portion 20 is pulled past the projections 36, i.e. pulled up within the cavity 18, once the upper lip portion 28 has passed the projections 36, and they have returned to their normal, at rest position, the tray portion 20 can rest against, or upon, the projections 36. In this position, the upper lip portion 28 is held on the upper surface of the projections 36, as seen in FIGS. 5 and 6. The tray portion 20 can then remain in this position until a user either pulls the tray portion 20 up higher within the cavity 18, or until a user pushes the tray portion 20 back into the cavity 18 past the projections 36.

This rest position allows a user to place the tray portion 20, containing the herbs, at a position that allows the user to have easy access to the herbs, so that the herbs of interest can be taken from the herb keeper without excess effort. It will therefore be understood that the placement of the projections 36 within the cavity 18 is preferably at a location that allows a user to easily access the tray portion 20 when resting on the projections 36.

In one embodiment, the projections 36 are formed from a flexible material such as rubber. Other flexible materials may also be used. The embodiment shown in the Figures includes four projections 36. However, it will be understood that different numbers of projections may be used provided that the projections are operable to flex, as described herein, and have sufficient strength to support the tray portion when it rests upon the projections. In one embodiment, the projections 36 may be overmolded on the inside of the cylindrical body 12. In another embodiment, the projections 36 may be glued to the inside of the cylindrical body 12.

In the illustrated embodiment, the projections 36 are supported by a collar portion, shown at numeral 38, which extends around the periphery of the cylindrical body 12, at a position that will allow easy access for a user to access the herbs within the tray portion 20, when the tray portion 20 rests upon the projections 36. The collar portion 38 may be connected to the cylindrical body 12 using a friction fit or snap fit, or tongue and groove configuration or any other configuration that would allow for the placement of the collar portion 38 and the function thereof, as described herein.

Figure 7:
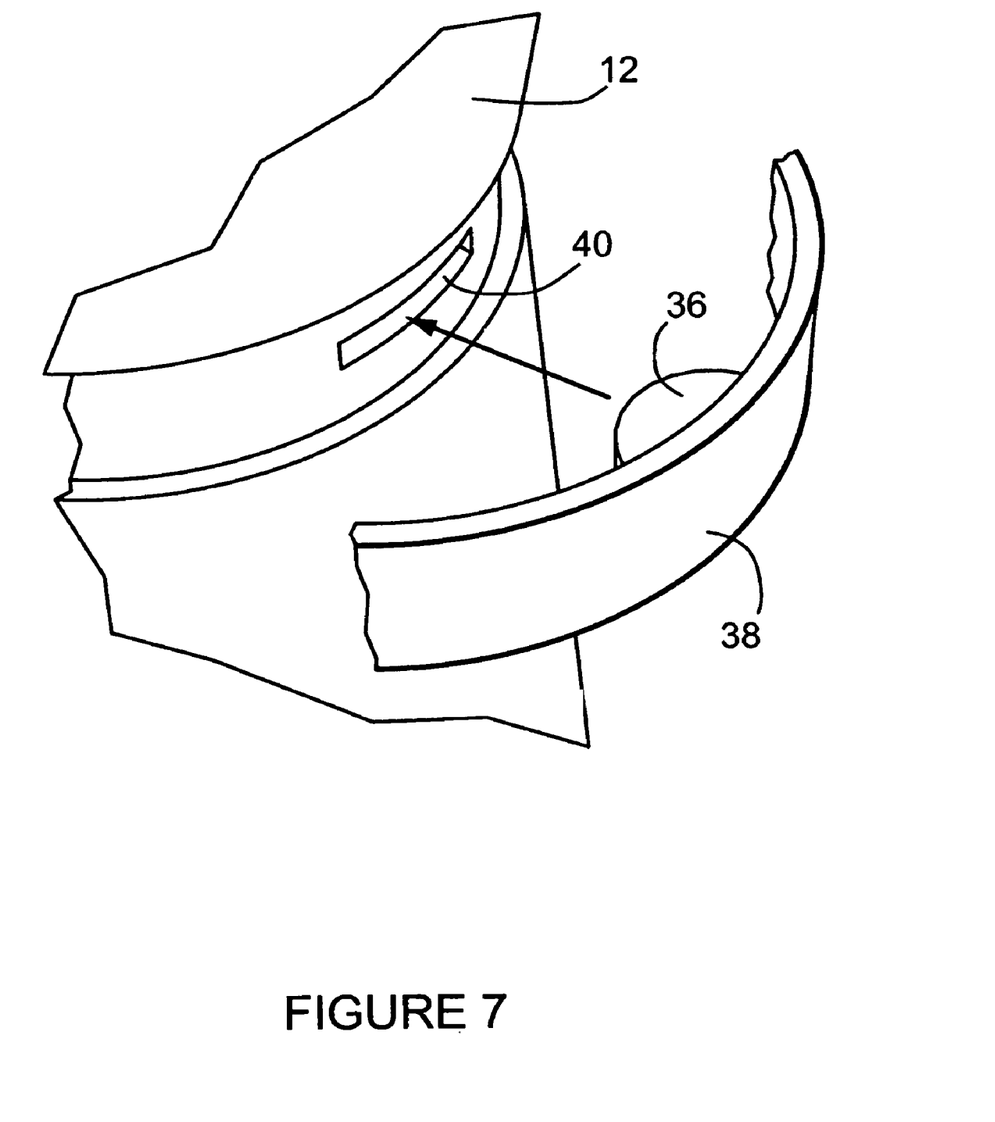
FIG. 7 is an enlarged view of the collar portion, including a projection, prior to placement of the projection through an aperture located on the body of the herb keeper.

In one embodiment, shown in FIG. 7, the cylindrical body 12 may include a series of apertures 40 located around the periphery of the body 12 and extending through the body 12. The projections 36 may extend through the apertures and into the cylindrical body 12. The projections 36 may be separate components that are attached to the cylindrical body 12 at the apertures or may be located on a collar portion 38, as shown, that extends around the cylindrical body 12 and positions the projections 36 adjacent and through the apertures.

In one embodiment, the collar portion is formed from flexible silicone material and is stretched around the cylindrical body 12 until the projections are aligned with the apertures 40. The collar portion 38 is then aligned with the body 12 to allow the projections 36 to pass through the apertures 40 and for the collar portion 38 to frictionally engage with the cylindrical body 12.

It will be understood from the description and the Figures provided that the projections may be located at any position on the collar, i.e. in the middle of the collar portion, as seen in FIG. 7, or on the top or bottom edge of the collar portion, provided that they are operable to function as described herein.

In an alternative embodiment, not illustrated, the peripheral edge of the tray portion 20 supports at least one projection 36 extending therefrom, and the body 12 includes a narrowed portion upon which the at least one projection 36 rests. In this embodiment, the at least one projection 36 may be integral with the tray portion 20 or may be a separate component connected to the tray portion 20. As per the above description, the tray portion 20 is sized and shaped to move up and down within the body 12. The projections 36 of the tray portion 20 may rest upon the upper portion of the narrower section of the body 12, holding the tray portion 20 at rest. When a user applies a force up or down on the tray portion 20 the projections 36 flex to allow the tray portion 20 to move past the narrower section of the body 12.

In an alternative embodiment, the peripheral edge of the tray portion 20 may support or include at least one projection 36 and the body 12 may include an internal ledge upon which the projections 36 may rest and hold the tray portion 20 in an at rest position. The projections 36 on the tray portion 20 are operable to flex when pushed or pulled past the internal ledge, to allow for movement of the tray portion 20 past the internal ledge. The internal ledge may extend around the complete internal periphery of the body or may extend along only a portion of the periphery provided that the ledge is operable to engage with the at least one projection to support the tray portion.

In one embodiment, the cylindrical body 12 includes a marking on the outside of the body, adjacent the closed end 14. The marking indicates a fill line to illustrate for a user a preferred amount of water to place in the cylindrical body 12 for maintaining freshness in the herbs or other food items. The marking may be a line that extends around the circumference of the cylindrical body, or a single marking at a specific point. Such markings are known and used in the culinary field.

In use, a user will place water in the bottom of the herb keeper 10, as indicated by the fill line. The tray portion 20 will then be placed in the cavity 18 of the cylindrical body 12 and the herbs or other food items of choice, such as asparagus, may be placed in the tray portion. Once the herbs, or other items, are placed in the tray portion 20, the tray portion 20 is lowered towards the closed end 14 of the cylindrical body 12. As the tray portion 20 moves down the cylindrical body 12 a user applies a force to the handle to move the tray portion 20 which in turn applies pressure from the tray portion 20 onto the projections 36 and flexes them downwardly, which allows the tray portion 20 to pass by the projections 36. Once the tray portion 20 has passed the projections 36, the projections return to their at rest position, extending into the cavity 18 of the cylindrical body 12.

Once the tray portion 20 containing the herbs, or other items, reaches the closed end 14, the lower portion of the tray portion 20 is submerged in the water which flows through the apertures 24 located in the lower surface 22 of the tray portion 20. The bottom of the herbs, or other items, are therefore submerged in water, which maintains their freshness.

When a user requires one or more herb(s), or other items, the user pulls upwardly on the knob 32 of the handle 30, removing the lid portion 34 and pulling the tray portion 20 up through the cavity 18 of the cylindrical body 12. When the upper lip portion 28 reaches the projections 36, the force being applied by the user to pull the tray portion 20 up causes the projections 36 to flex upwardly, allowing for the tray portion 20, and in particular the upper lip portion 28, to pass by the projections 36. Once the upper lip portion 28 has passed by the projections 36, the projections 36 return to their at rest position, extending into the cavity 18. At this time, the user no longer needs to pull the tray portion 20 upwardly and can leave the tray portion 20 to rest upon the projections 36. The tray portion 20 will be held in place by the upper lip portion 28 resting on the surface of the projections 36. The user can now easily access the herb(s), or other items, as desired. The herbs, which may have wet bottom ends in the tray, may remain in the keeper and the top ends cut or pinched off, in effect spilling or displacing the contents.

If the user wishes to remove the tray portion 20 for cleaning, or for any other reason, the user can continue to pull upwardly on the tray portion 20 until it is free and clear of the cylindrical body 12. If the user wishes to return the tray portion 20, and the herb(s) etc. kept within it, to the closed end 14 of the cylindrical body, then the user merely applies a force downwardly upon the tray portion 20, through knob 32 and handle 30. Downward pressure forces the upper lip portion 28 against the projections 36 which causes the projections 36 to bend and flex downwardly, allowing the tray portion 20 to pass by the projections 36 and be lowered to the bottom of the cavity 18.

While this herb keeper has been described with reference to illustrative embodiments and examples, the description is not intended to be construed in a limiting sense. Thus, various modifications of the illustrative embodiments, as well as other embodiments, will be apparent to persons skilled in the art upon reference to this description. It is therefore contemplated that the appended claims will cover any such modifications or embodiments. Further, all of the claims are hereby incorporated by reference into the description of the preferred embodiments.

The invention claimed is:

1. A herb keeper comprising:
   a body having a closed end and an open end defining a cavity therebetween; and
   a removable tray portion sized to be slidingly received within the cavity of the body, the body comprising at least one aperture through which at least one flexible projection is received, the least one flexible projection extending into the cavity of the body toward the tray portion, the at least one flexible projection being of sufficient flexibility to allow forcible passage of the tray portion thereby and being of sufficient rigidity to support the tray portion in a rest position thereon.

2. The herb keeper according to claim 1, wherein the at least one flexible projection is supported by the body.

3. The herb keeper according to claim 1, comprising at least a second flexible projection extending from the tray portion toward the body, wherein the second flexible projection is supported by the tray portion.

4. The herb keeper according to claim 3, wherein the tray portion comprises a base having a plurality of apertures therein and an upwardly extending peripheral wall surrounding the base, the wall having an upper lip portion extending outwardly therefrom, the base and peripheral wall defining a receptacle for receiving food items therein.

5. The herb keeper according to claim 4, wherein the second flexible projection extends outwardly from the upper lip portion.

6. The herb keeper according to claim 4, wherein the upper lip portion is the second flexible projection.

7. The herb keeper according to claim 4, wherein the food items are herbs.

8. The herb keeper according to claim 1, wherein the tray portion further comprises an elongate handle to allow a user to move the tray portion within the body.

9. The herb keeper according to claim 1, comprising four flexible projections.

10. The herb keeper according to claim 1, wherein the body includes a peripheral collar portion comprising the at least one flexible projection.

11. The herb keeper according to claim 10, wherein the collar portion is releasably attached to the body.

12. The herb keeper according to claim 1, wherein the body is a cylindrical body.

* * * * *